(12) United States Patent
Bowler et al.

(10) Patent No.: US 9,479,255 B2
(45) Date of Patent: Oct. 25, 2016

(54) METHOD AND APPARATUS FOR CONTROLLING THE OPTICAL OUTPUT POWER FROM A BURST MODE LASER

(75) Inventors: David B. Bowler, Acton, MA (US); James M. Aufiero, Reading, MA (US); Francis J. Calabresi, Harvard, MA (US); Christopher J. Pekalsky, Raymond, NH (US)

(73) Assignee: ARRIS Enterprises, Inc., Suwanee, GA (US)

( * ) Notice: Subject to any disclaimer, the term of this patent is extended or adjusted under 35 U.S.C. 154(b) by 793 days.

(21) Appl. No.: 12/112,569

(22) Filed: Apr. 30, 2008

(65) Prior Publication Data

US 2009/0274471 A1 Nov. 5, 2009

(51) Int. Cl.
*H04B 10/27* (2013.01)
*H04B 10/564* (2013.01)
*H04J 3/16* (2006.01)

(52) U.S. Cl.
CPC ............ *H04B 10/27* (2013.01); *H04B 10/564* (2013.01); *H04J 3/1694* (2013.01)

(58) Field of Classification Search
USPC ................ 398/38, 93, 94, 195, 197, 198
See application file for complete search history.

(56) References Cited

U.S. PATENT DOCUMENTS

| | | | |
|---|---|---|---|
| 4,945,541 A * | 7/1990 | Nakayama | 372/31 |
| 6,043,915 A * | 3/2000 | Giles et al. | 398/94 |
| 6,738,401 B2 * | 5/2004 | Bowler et al. | 372/38.02 |
| 6,940,882 B2 * | 9/2005 | Couch | 372/38.02 |
| 6,963,696 B1 | 11/2005 | Bowler et al. | |
| 7,031,357 B2 | 4/2006 | Bowler et al. | |
| 7,120,179 B2 * | 10/2006 | Fennelly et al. | 372/38.02 |
| 7,127,133 B2 * | 10/2006 | Manderscheid | 385/14 |
| 7,362,498 B1 * | 4/2008 | Li et al. | 359/341.41 |

(Continued)

FOREIGN PATENT DOCUMENTS

WO   WO 2004/025793 A1   3/2004

OTHER PUBLICATIONS

PCT Search Report and Written Opinion, RE: Application #PCT/US2009/040778 Jun. 16, 2009.

(Continued)

*Primary Examiner* — Agustin Bello
(74) *Attorney, Agent, or Firm* — Lori Anne D. Swanson

(57) ABSTRACT

An optical network terminal is provided for use in a passive optical network (PON). The optical network terminal includes a data port for receiving data packets from an external device and a processor for converting the data packets to data link frames. In addition, the optical network terminal includes a memory configured to store a time division multiplexing scheme identifying a time slot assigned to each of a plurality of network nodes in the PON for transmission of upstream optical signals. An optical transceiver is provided for converting the data link frames to upstream optical signals and transmitting the optical signals on an upstream TDMA (time division, multiple access) channel to an Optical Line Terminal (OLT). The optical transceiver includes a burst mode laser diode for generating the optical signals and a burst mode laser driver for biasing the laser diode with a bias signal and a modulation bias signal. The laser driver includes a dual closed loop feedback control circuit. The dual closed loop feedback control circuit is configured to measure and adjust a logic zero output power level from the laser diode during a time slot identified from the time division multiplexing scheme stored in the memory.

17 Claims, 3 Drawing Sheets

(56) References Cited

U.S. PATENT DOCUMENTS

| | | | |
|---|---|---|---|
| RE41,045 E * | 12/2009 | Sluijter et al. | 607/100 |
| 7,970,288 B2 * | 6/2011 | Chao et al. | 398/192 |
| 2002/0027688 A1 | 3/2002 | Stephenson | |
| 2002/0027690 A1 * | 3/2002 | Bartur et al. | 359/152 |
| 2002/0181057 A1 | 12/2002 | Ao et al. | |
| 2003/0113118 A1 * | 6/2003 | Bartur | 398/139 |
| 2003/0174744 A1 * | 9/2003 | Reilly | 372/32 |
| 2003/0219050 A1 * | 11/2003 | Couch | 372/38.02 |
| 2003/0219254 A1 * | 11/2003 | Couch | 398/135 |
| 2005/0152416 A1 | 7/2005 | Chang | |
| 2005/0201761 A1 * | 9/2005 | Bartur et al. | 398/197 |
| 2007/0116466 A1 | 5/2007 | Gewirtzman et al. | |
| 2007/0122157 A1 * | 5/2007 | Vandewege et al. | 398/141 |
| 2007/0274341 A1 | 11/2007 | Rodriguez | |
| 2008/0002718 A1 | 1/2008 | Bernard et al. | |
| 2008/0013151 A1 | 1/2008 | Draper | |
| 2008/0019689 A1 | 1/2008 | Brooks et al. | |
| 2008/0019690 A1 | 1/2008 | Zhao et al. | |
| 2008/0037535 A1 | 2/2008 | Yoon et al. | |
| 2008/0056731 A1 | 3/2008 | Weber et al. | |
| 2009/0052908 A1 * | 2/2009 | Best | 398/182 |
| 2009/0274471 A1 * | 11/2009 | Bowler et al. | 398/197 |
| 2009/0310961 A1 * | 12/2009 | Bowler et al. | 398/38 |

OTHER PUBLICATIONS

Extended EPC Search Report, RE: Application #09739725.8-1860/2283592 PCT/US2009040778, Jul. 24, 2013.

J. Bauwelnick, et al., "A Fast and Intelligent Automatic Power Control for a GPON Burst-Mode Optical Transmitter", IEEE Photonics Technology Letters, vol. 17, No. 11, Nov. 1, 2005, pp. 2439-2441.

Official Action, Canadian Application #2,722,400, Apr. 15, 2013.

Official Action, Chinese Application #200980114897.8 (Foreign Text & English Translation), Apr. 3, 2013.

Office Action RE: Canadian Patent Application #2,722,400; dated Jun. 13, 2014.

Official Action, RE: Canadian Application No. 2,722,400, dated Feb. 23, 2016.

* cited by examiner

METHOD AND APPARATUS FOR CONTROLLING THE OPTICAL OUTPUT POWER FROM A BURST MODE LASER

FIELD OF THE INVENTION

The present invention relates generally to burst mode laser diodes employed in communications networks such as passive optical networks (PONs), and more particularly to feedback control circuits for controlling the optical output power generated by the burst mode laser diodes.

BACKGROUND OF THE INVENTION

Laser diodes are typically used to transmit data information over fiber optic networks. To achieve higher speed data rates, a laser diode can be biased with a drive current so it is 'ON' and produces at least a minimal optical output. While the diode is biased, the diode can be driven with additional current so that the light output of the diode varies over time between two power output levels. One power output level of the diode can represent a logic low or zero while another power output level of the diode can represent a logic high or one. The optical extinction ratio is the term applied to the relationship in dB between the logic one optical power level and the logic zero optical power level.

A burst mode laser, in contrast to a continuous mode laser, produces output only during selected intervals. It will be appreciated that the burst-mode transmitter is essentially turned off and does not transmit an optical signal until a burst-mode incoming signal is received. Only upon receiving the incoming signal will the burst-mode transmitter operate in comparison to the constant transmission of optical signals at the output of the conventional transmitters. It will be appreciated that the incoming signals can be of various lengths of data, where some signals can be as short as 10 microseconds, for instance, in the case of a DOCSIS burst signal. In a Gigabit PON (GPON), the minimum burst time is 32 ns including the preamble, delimiter and data. The minimum amount of data per burst is 1 byte (6.4 ns)

The laser output power is set by the amount of current passing through the laser. Typically, a bias current is applied to bring the laser up to its threshold and then a modulation current is added to amplitude modulate the laser with a baseband digital signal. The relationship between modulation current and laser output power is commonly referred to as "slope efficiency". As temperature increases, the laser threshold increases and the slope efficiency decreases. As temperature decreases, the laser threshold decreases and slope efficiency increases. As the laser ages, laser threshold increases and slope efficiency decreases. Laser aging is very similar to operating at a higher temperature.

To compensate for temperature fluctuations and aging, many laser driver control circuits employ an analog control loop to maintain a constant average output power from the laser. A power monitor photodiode senses the output power of the laser for feedback to the driver control circuit. In particular, the power monitor photodiode typically receives a portion of the output power from the back facet of the laser and generates a current that is proportional to the output power from the front facet of the laser. The front facet of the laser is aligned with the fiber core to create a signal output path.

The laser driver control circuit may include an analog loop that compares the photodiode current to a reference current value. Based on the comparison, the driver control circuit adjusts the bias current to reduce the error between the photodiode current and the reference current. In some circuits, as an alternative, the photodiode current is applied to a resistor to produce a monitor voltage indicating the output power of the laser. The driver control circuit then compares the monitor voltage to a reference voltage and controls the laser drive current to reduce error.

The analog control loop that is employed may be an open loop or closed loop circuit. In an open loop circuit, temperature indexed look up tables are used for both the bias and modulation currents. One obstacle to implementing this method is the generation of the look up table itself, which is a time consuming process. In addition, the problem of laser aging is generally handled by setting the laser power to the maximum allowed by its specification and then letting the laser fail over time. Unfortunately, this has the added effect of prematurely aging the laser.

Closed loop control circuits generally handle temperature fluctuations and laser aging better than open loop circuits. Closed loop control circuits may employ a single closed loop or a dual closed loop. In a single loop control circuit, the average power level is measured during each burst using the photodiode as a monitor. The bias current is then adjusted in order to keep a constant current out of the photodiode. The modulation current is typically adjusted using a temperature indexed look up table. Unfortunately, this technique is not an effective way to maintain a high extinction ratio without risking severe eye diagram distortion.

In a dual closed loop control circuit, the bias current is adjusted until the desired logic level zero is achieved and the modulation current is adjusted to keep the average transmit power during each burst at a desired level. While in principle a dual closed loop control circuit provides the best response, it can be difficult to implement, particularly when very high extinction ratios are employed. This is because high extinction ratios require very low logic zero power levels, in some cases less than 10 microwatts, which can be very difficult to measure. To ensure an accurate measurement of the zero power level, it typically will be necessary to measure an extended string of zeros.

SUMMARY OF THE INVENTION

In accordance with one aspect of the invention, an optical network terminal is provided for use in a passive optical network (PON). The optical network terminal includes a data port for receiving data packets from an external device and a processor for converting the data packets to data link frames. In addition, the optical network terminal includes a memory configured to store a time division multiplexing scheme identifying a time slot assigned to each of a plurality of network nodes in the PON for transmission of upstream optical signals. An optical transceiver is provided for converting the data link frames to upstream optical signals and transmitting the optical signals on an upstream TDMA (time division, multiple access) channel to an Optical Line Terminal (OLT). The optical transceiver includes a burst mode laser diode for generating the optical signals and a burst mode laser driver for biasing the laser diode with a bias signal and a modulation bias signal. The laser driver includes a dual closed loop feedback control circuit. The dual closed loop feedback control circuit is configured to measure and adjust a logic zero output power level from the laser diode during a time slot identified from the time division multiplexing scheme stored in the memory.

In accordance with another aspect of the invention, the dual closed loop feedback control circuit may be further configured to measure and adjust the logic zero output power level from the laser diode during an idle period when each of the plurality of network nodes in the PON are not transmitting upstream optical signals.

In accordance with another aspect of the invention, the dual closed loop feedback control circuit may be further configured to measure and adjust an average transmit power level of a burst from the burst mode laser during a TDMA timeslot in which the burst mode laser is generating upstream optical signals.

In accordance with another aspect of the invention, a method is provided for calibrating at least one optical power level generated by a burst mode laser. The method includes measuring a logic zero output power level from a burst mode laser employed in a network node when each of a plurality of network nodes in an optical communications network are not transmitting upstream optical signals. The measured logic zero output power level from the burst mode laser is compared to a first target power level and a bias current applied to the burst mode laser is adjusted to achieve the first target power level.

In accordance with another aspect of the invention, the method may further include: measuring an average transmit power level of a burst from the burst mode laser during normal in-service operation of the optical communications network; comparing the measured average transmit power level from the burst mode laser to a second target power level; and adjusting a modulation current applied to the burst mode laser to achieve the second target power level.

In accordance with another aspect of the invention, each of the network nodes may be configured to transmit the upstream optical signals during a different TDMA (time division, multiple access) timeslot and the logic zero output power level may be measured during a remaining available TDMA time slot.

DETAILED DESCRIPTION

Figure 1:
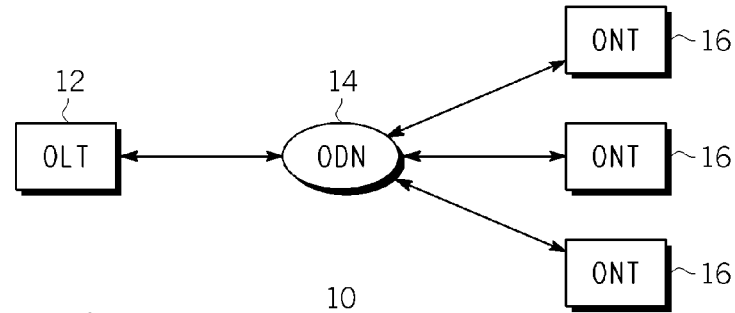
FIG. 1 shows an example of an optical communications network that may employ a burst mode laser.

FIG. 1 shows an example of an optical communications network that may employ a burst mode laser. While a passive optical network (PON) 10 is shown for illustrative purposes, those of ordinary skill in the art will recognize that the network may be of any type in which a burst mode laser may be employed. The PON 10 includes an optical line terminal (OLT) 12 joined through an optical distribution network (ODN) 14 to a plurality of optical network terminals (ONTs) 16. The ODN 14 includes at least one passive optical splitter that, for downstream communications, splits optical data bursts between multiple ONTs 16.

Use of a broadcast mechanism for upstream traffic requires a scheme to avoid data collisions. One technique for managing the upstream traffic employs a TDMA (time division, multiple access) protocol in which dedicated transmission time slots are granted to each ONT 16. In a TDMA scheme all ONTs are time synchronized and each transmits data only during its assigned time slot. Upstream data received by the OLT 12 from an ONT 16 is processed and forwarded to its intended destination beyond the PON.

During initialization, the OLT 12 distributes a map identifying a time division multiplexing (TDM) transmission scheme, in which each ONT 16 is assigned one or more upstream channels (e.g., time slots) during which the ONT 16 may uniquely transmit optical data bursts upstream to the OLT 12. Each ONT 16 may also be assigned one or more downstream channels (e.g., time slots) during which the OLT 12 transmits data packets directed to the corresponding ONT 16.

PON technologies, including Broadband PONs (BPONs) and Gigabit PONs (GPONs), are described in various standards such as the International Telecommunications Union (ITU) Specification ITU-T G.983.1, entitled, Broadband Optical Access Systems Based on Passive Optical Networks (PON), which is incorporated herein by reference. G-PON standards are described in the International Telecommunications Union Specifications ITU-T G.984.1 through 984.6, which is also incorporated by reference.

Figure 2:
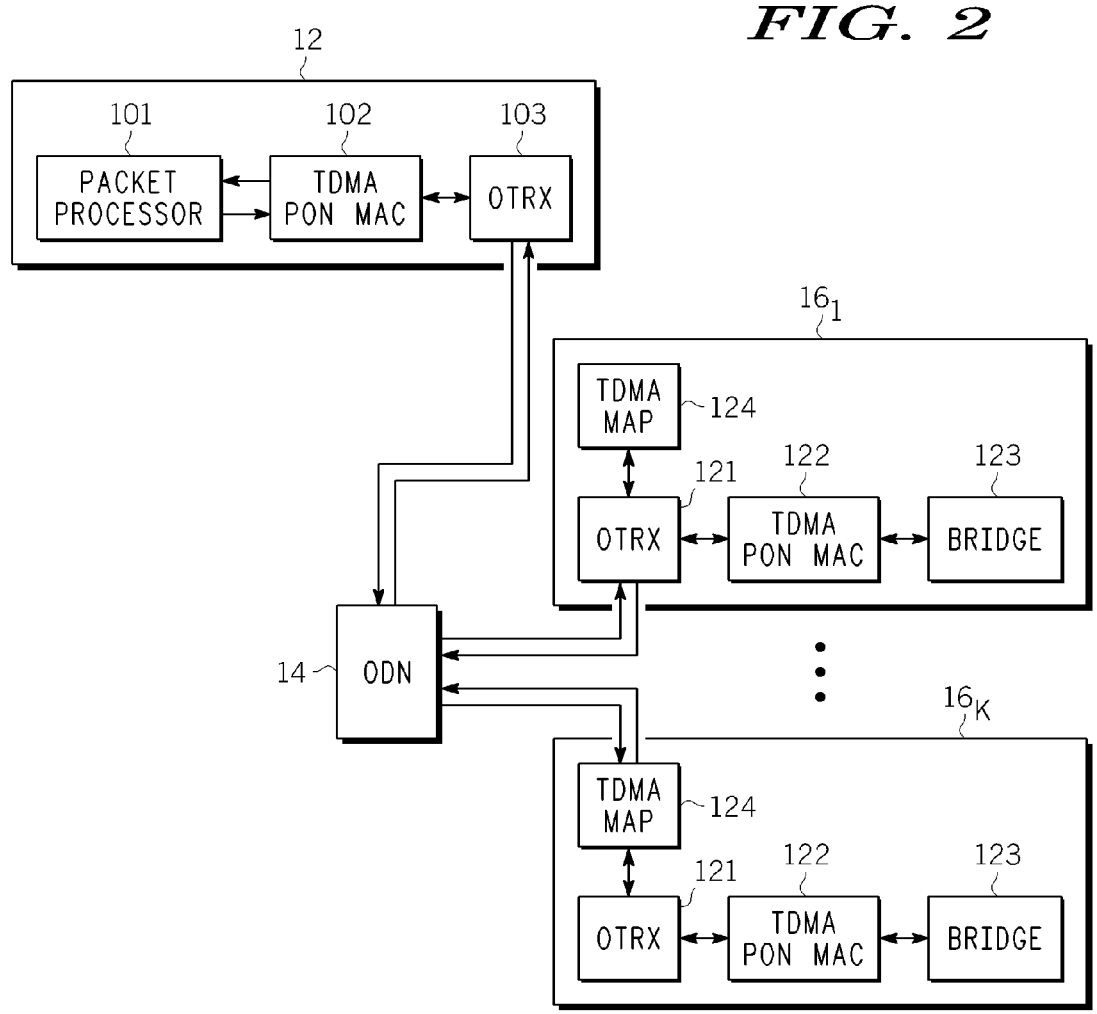
FIG. 2 shows a more detailed example of an optical communications network that may employ a burst mode laser for the purposes of illustrating downstream and upstream data transmission.

Downstream traffic for a transmission from an OLT 12 toward ONTs 16$_1$-16$_k$ will now be described with reference to FIG. 2. A packet processor 101 in the OLT 12 processes data packets received from an external node or the ONTs 16$_1$-16$_k$ and transmits the packets to TDMA PON medium access control (MAC) processor 102. The TDMA PON MAC processor 102 transmits data link frames such as TDMA PON frames having logical link identifiers (LLIDs) or optical network unit (ONU) IDs to optical transceiver 103 in accordance with recommendations defined, for instance, in the GPON and EPON standards. The optical transceiver 103 converts electric signals into optical signals and transmit the optical signals to a splitter 14 that serves as the ODN. The splitter 14 splits each of the optical signals into k optical signals and transmits the k optical signals to the ONTs 16$_1$-16$_k$. Optical transceivers 121 in the ONTs 16$_1$-16$_k$ convert the optical signals into electric signals and transmit the electric signals to TDMA PON MAC processors 122. The TDMA PON MAC processors 122 extract data from the electric signals to recover the data link frames (e.g., TDMA PON frames) transmitted from the OLT 12. The TDMA PON MAC processors 122 convert the recovered data link frames into data packets such as Ethernet packets and transmit the packets to destination ports such as bridges 123. The bridges 123 transmit the packets to destination subscriber devices.

Upstream signals transmitted from the ONTs 16$_1$-16$_k$ to the OLT 12 will now be described. The destination ports (e.g., bridges) 123 of the ONTs 16$_1$-16$_k$ transmit Ethernet packets received from subscriber devices to the TDMA PON MAC processors 122. The TDMA PON MAC processors 122 convert the Ethernet packets into data link frames (e.g., TDMA PON frames). The data link frames are transmitted to the optical transceivers 121 under the control of the OLT 12. The optical transceivers 121 convert electric signals into optical signals and transmit the optical signals during a time interval assigned to each ONT 16$_1$-16$_k$. The appropriate time intervals may be identified by reference to the time division multiplexing transmission scheme that may be stored in memories 124. Such a signal transmission method is called a burst mode. The splitter 14 multiplexes signals received from the k ONTs and transmits the multiplexed signals to the optical transceiver 103 of the OLT 12. The optical transceiver 103 extracts data from the optical signals and transmits the extracted data to the TDMA PON MAC processor 102. The TDMA PON MAC processor 102 processes frames and transmits the processed frames to the packet processor 101. The packet processor 101 processes packets received from the TDMA PON MAC processor 102 and transmits the processed packets to a destination port.

Figure 3:
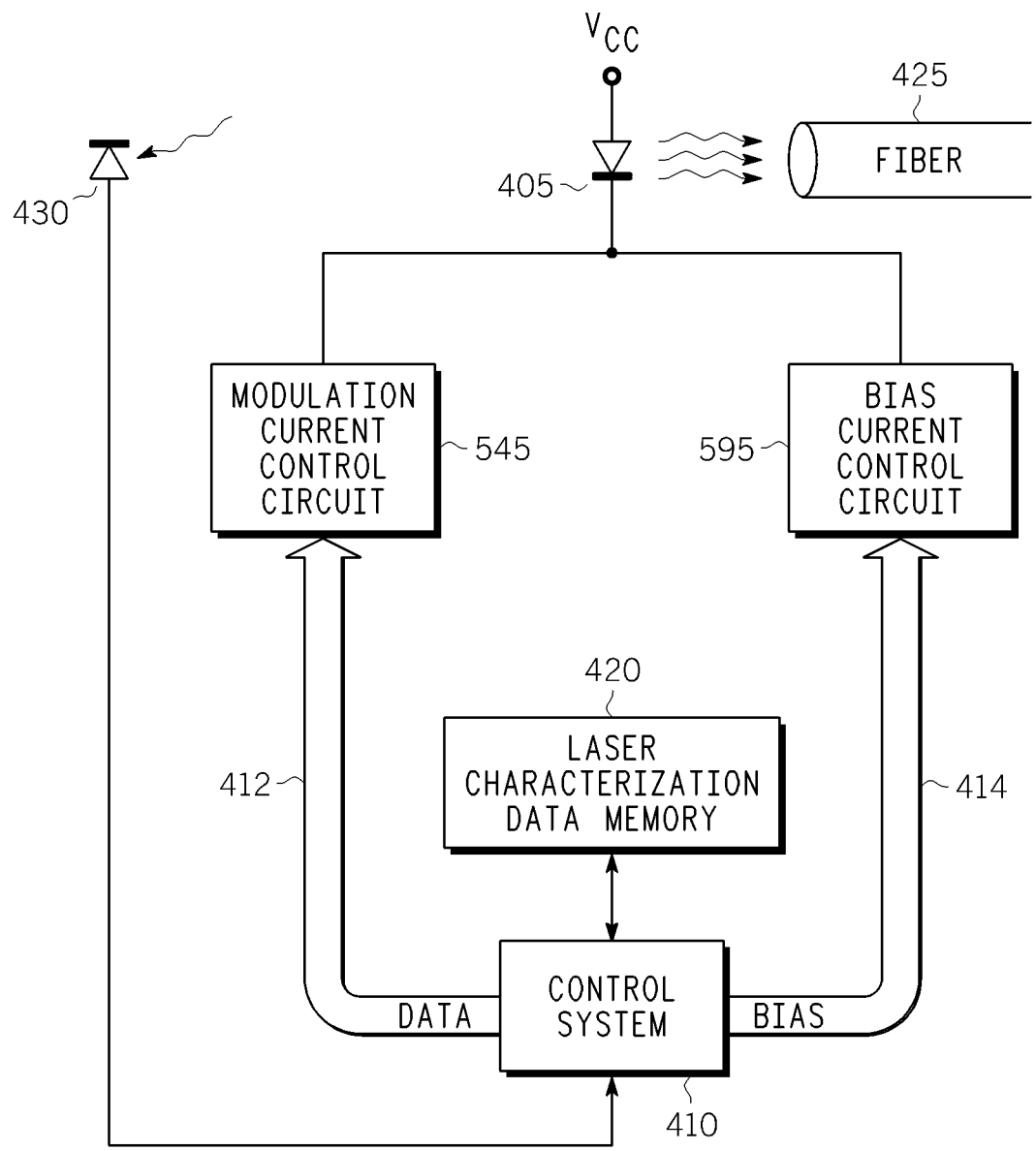
FIG. 3 is a block diagram of a burst mode laser driver.

The optical transceivers 121 each include a burst mode laser to transmit optical signals during their respectively assigned time intervals. FIG. 3 is a block diagram of a burst mode laser driver. As shown, control system 410 generates data signal 412 and bias signal 414 that respectively drive modulation current control circuit 545 and bias current control circuit 595. A combination of these circuits, which may include software, processor devices, memory devices and related circuitry, can be used to control the light output generated by the burst mode laser diode 405. The light output generated by diode 405 can be coupled to fiber 425 that is in turn coupled to the ODN 14 shown in FIG. 1. A monitoring photodiode 430 receives light from the back facet of the laser diode 405. The photo diode converts the light into an electrical signal for feedback to the control system 410. A representative example of the bias current control circuit 595 and the drive modulation current control circuit 545 is shown, for instance, in U.S. Pat. Nos. 6,738,401 and 7,031,357, which are hereby incorporated by reference in their entirety.

Control system 410 may serve as the controller in a dual closed loop control circuit. As previously noted, in a dual closed loop control circuit, the bias (i.e., DC) current is adjusted until the desired logic zero output power level (i.e., the optical output power of the laser diode that corresponds to a logic zero) is achieved and the modulation (i.e., AC) current is adjusted to keep the average transmit power during each burst at the desired level. In this way variations in optical output power can be eliminated that may arise from such things as temperature fluctuations and laser aging. As also previously mentioned, obtaining an accurate calibration measurement of the logic zero output power level using photodiode 430 can be problematic because of the low optical power levels that are often involved.

Prior to operation of the dual closed loop control circuit described herein, only three readily available items of data are needed concerning the laser characterization. First, the monitor photodiode responsivity is needed. The monitor photodiode responsivity expresses the relationship between the optical output from the front facet of the laser diode 405 and the electric current generated by the photodiode 430 in response to the receipt of the optical output from the back facet of the laser diode 405. The monitor photodiode responsivity may be supplemented by two additional items that express the extent to which the monitor photodiode responsivity deviates with variations in temperature. The high temperature tracking error is a correction factor that denotes the extent to which the relationship between the optical output power and the electric current from the photodiode deviates at high temperatures. Similarly, the low temperature tracking error is a correction factor that denotes the extent to which the relationship between the optical output power and the electric current from the photodiode deviates at low temperatures. These three pieces of laser characterization data may be stored in a memory 420 associated with the control system 410.

Measurement of the logic zero power level can be accomplished by transmitting a string of zeros during any idle periods (e.g., timeslots) when each of the ONTs 16 in the PON 10 are otherwise not transmitting any optical signals. In this way the measurement can be performed without interfering with upstream transmission to the OLT 12. Available timeslots for performing the zero power level measurement can be determined by examining the aforementioned TDMA transmission scheme map that is distributed to all the ONTs. The available timeslots may be timeslots that are simply unused or which are expressly reserved for laser control and calibration.

In addition to measuring the logic zero power level during timeslots when none of the ONTs are transmitting, the logic zero power level may also be measured during boot-up or initialization of the transceiver.

Because of the relatively low power level emitted by the laser diode 405 when generating a logic zero, it may be necessary to increase the gain of the photodiode 430 when measuring the logic zero level. The gain of the photodiode can be returned to its normal, lower level after the measurement is complete.

The photodiode 430 generates an electric signal from the zero power level optical signal received from the back facet of the laser diode 405. The control system 410 receives the electric signal and compares it to a desired value of the electric signal. The desired value of the electric signal, which corresponds to the desired logic zero power level, is determined from the monitor photodiode responsivity data stored in memory 420. Based on the value of the measured electric signal and the monitor photodiode responsivity data, the control system 410 causes the bias current control circuit 595 to adjust the bias applied to the laser diode 405 as necessary to achieve the desired logic zero optical output value from the laser diode 405. The monitor photodiode responsivity data that is used may be modified as appropriate by the available low temperature or the high temperature tracking error data.

Since a dual closed loop control circuit is being employed, the modulation current may need to be adjusted to keep the average transmit power during each burst from the laser diode 405 at the desired level. This adjustment can be accomplished while the PON is in its normal in-service operational state. In particular, during the timeslot when any particular ONT is transmitting data, the photodiode 430 measures the average transmit power from the laser diode 405. Based on the measured power level, the control system 410 associated with the particular ONT causes the modulation current control circuit 545 to adjust the modulation bias applied to the laser diode 405 as necessary to achieve the desired average transmit power from the laser diode 405.

Figure 4:
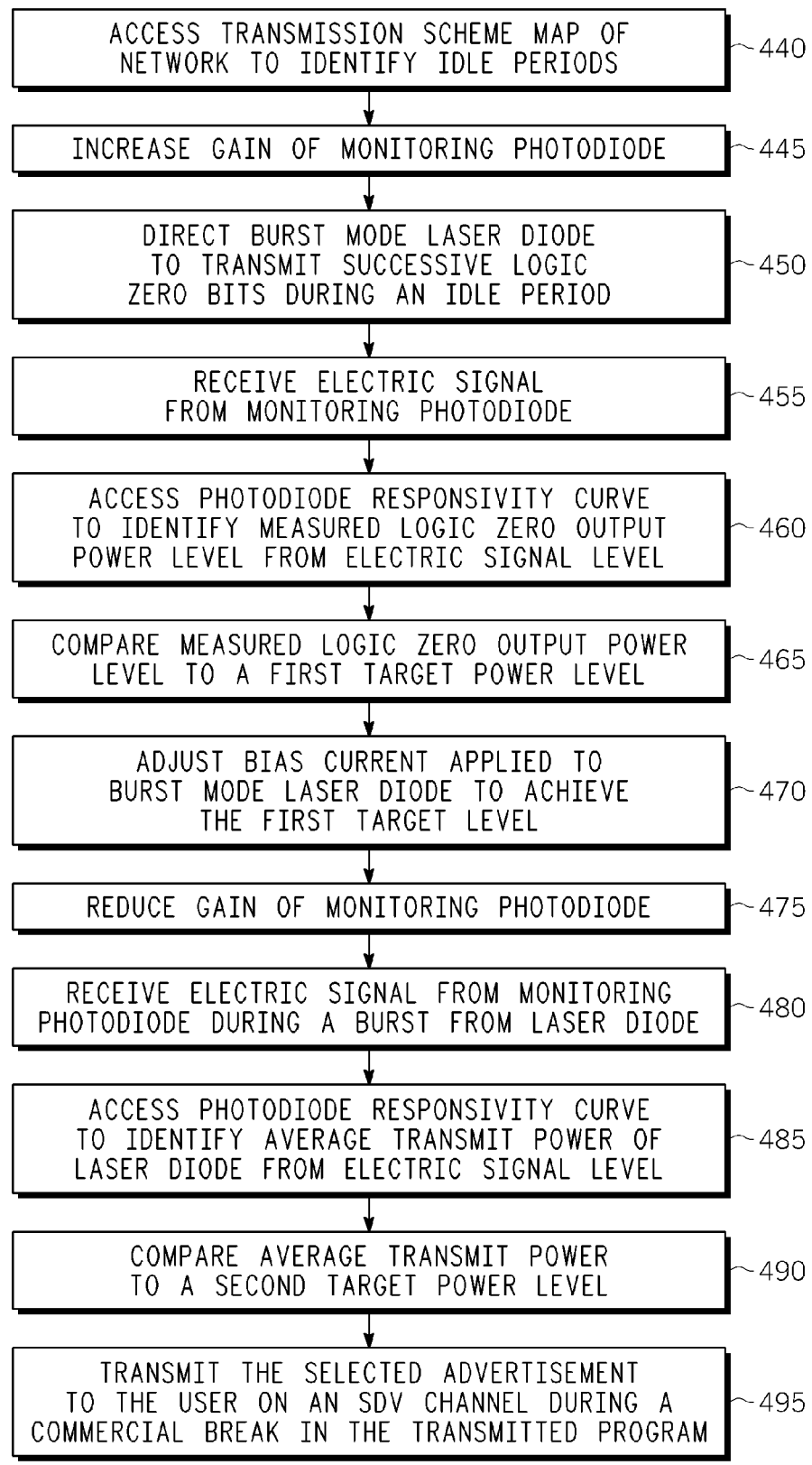
FIG. 4 shows one example of a method performed by a dual closed loop feedback control arrangement used in a burst mode laser driver.

FIG. 4 shows one example of a method performed by a dual closed loop feedback control arrangement used in a burst mode laser driver. The method begins in step 440 when the control arrangement in a particular network node of a communications network accesses a transmission scheme map, which is available to each of the network nodes in the network, to identify the idle period when each of the plurality of network nodes in the communications network are not transmitting upstream optical signals. Upon arrival of the idle period, the control arrangement in step 445 causes an increase in the gain response of the monitoring photodiode. In addition, in step 450 the control arrangement also directs the burst mode laser diode to transmit an optical test signal during the idle period. The optical test signal includes successive logic zero bits. Next, an electric signal is received from the monitoring photodiode in step 455. The electric signal is generated by the photodiode in response to optical power received from a back facet of the burst mode laser diode. In step 460, the photodiode responsivity curve is accessed to identify the measured logic zero output power level based on a value of the electric signal received from the photodiode. The measured logic zero output power level from the burst mode laser is compared to a first target power level in step 465 and the bias current applied to the burst mode laser is adjusted in step 470 to achieve the first target power level.

The method continues when the burst mode laser is generating a burst of data during its normal operation. If the gain of the photodiode has not already been reduced, it is directed to do so in step 475. Next, an electric signal corresponding to the average transmit power generated by the laser diode during the burst is received from the monitoring photodiode in step 480. In step 485, the photodiode responsivity curve is once again accessed to identify the average transmit power based on a value of the electric signal received from the photodiode. The measured average transmit power from the burst mode laser is compared to a first target power level in step 490 and the modulation bias current applied to the burst mode laser is adjusted in step 495 to achieve a second target power level that represents the desired average transmit power.

The processes described above, including but not limited to those presented in connection with FIG. 4, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for calibrating with high accuracy both the logic zero and logic one power levels of a burst mode laser employed in an optical network terminal. In this way the optical output values from the burst mode laser can be maintained at their desired levels, thereby avoiding fluctuations that could arise from a number of factors such as changes in temperature and laser aging. The calibration process can be conveniently performed during idle periods while the optical network terminal is in operation. As a result high accuracy calibration measurements can be performed, even at high extinction ratios.

The invention claimed is:

1. A computer-readable storage medium containing instructions which, when performed by one or more processors disposed in an electronic device, performs a method comprising:
   causing measurement of a power level of signals transmitted from a burst mode laser employed in a network node for each of the following:
      at initialization of the burst mode laser, following both (i) an increase in a gain of a monitoring photodiode that measures an average transmit power from the burst mode laser, and (ii) transmission from the burst mode laser of successive logic zero bits,
      during at least one idle time slot on an upstream time division multiple access (TDMA) channel when each of a plurality of network nodes in a passive optical network (PON) including the network node are not transmitting upstream optical signals, following both (i) an increase in the gain of a monitoring photodiode that measures an average transmit power from the burst mode laser, and (ii) transmission from the burst mode laser of successive logic zero bits,
      during operation of the burst mode laser over an assigned time slot on the upstream TDMA channel, following both (i) a decrease in the gain of a monitoring photodiode and (ii) a transmission of optical signals, said burst mode laser being biased to transmit logic zero and logic one optical signals only when an incoming data signal is received;
   comparing each of the measured power levels from the burst mode laser to a respective target power level; and
   causing adjustment of a bias current applied to the burst mode laser to achieve the respective target power level.

2. The computer-readable storage medium of claim 1 further comprising:
   causing measurement of an average transmit power level of a burst from the burst mode laser during normal in-service operation of the passive optical network;
   comparing the measured average transmit power level from the burst mode laser to a second target power level; and
   causing adjustment of a modulation current applied to the burst mode laser to achieve the second target power level.

3. The computer-readable storage medium of claim 1 wherein at least one of the network nodes is an Optical Network Terminal (ONT).

4. The computer-readable storage medium of claim 2 wherein each of the network nodes is configured to transmit the upstream optical signals during a different TDMA (time division, multiple access) timeslot and the at least one idle time slot corresponds to at least one remaining available TDMA time slot.

5. The computer-readable storage medium of claim 4 wherein the average transmit power level is measured during the TDMA time slot in which the network node including the burst is last configured to transmit the upstream optical signals.

6. The computer-readable storage medium of claim 1 wherein causing the measurement of the power level of signals from the burst mode laser includes receiving an electric signal from the monitoring photodiode which is generated in response to optical power received from a back facet of the burst mode laser.

7. The computer-readable storage medium of claim 6 further comprising causing an increase in gain response of the photodiode while receiving the logic zero output power level from the back facet of the burst mode laser.

8. The computer-readable storage medium of claim 6 wherein comparing the measured power level of the burst mode laser to a first target power level includes examining the monitoring photodiode responsivity curve to identify a measured logic zero output power level based on a value of electric signal received from the photodiode.

9. An optical network terminal for use in a passive optical network (PON), comprising:
   a data port for receiving data packets from an external device;
   a processor for converting the data packets to data link frames;
   a memory configured to store a time division multiplexing scheme identifying a time slot assigned to each of a plurality of network nodes in the PON for transmission of upstream optical signals;
   an optical transceiver for converting the data link frames to upstream optical signals and transmitting the optical signals on an upstream TDMA (time division, multiple access) channel to an Optical Line Terminal (OLT) during the optical network terminal's assigned time slot, wherein the optical transceiver includes:
a burst mode laser diode for generating the optical signals; and
a burst mode laser driver for biasing the laser diode with a bias signal and modulation signal, the laser driver including a dual closed loop feedback control circuit, the dual closed loop feedback control circuit being configured to adjust the burst mode laser diode in accordance with the following:
at initialization of the optical transceiver, increasing a gain of a monitoring photodiode that measures an average transmit power from the burst mode laser diode, transmitting from the burst mode laser diode successive logic zero bits, and adjusting a bias current applied to the burst mode laser diode until a desired optical zero power achieved,
during an idle time slot on the upstream TDMA channel when each of the plurality of network nodes in the PON including said optical network terminal are not transmitting upstream optical signals, increasing the gain of a monitoring photodiode that measures an average transmit power from the burst mode laser diode, transmitting from the burst mode laser diode successive logic zero bits, and adjusting a bias current applied to the burst mode laser diode until a target power level is achieved,
during operation of the burst mode laser diode over the optical network terminal's assigned time slot on the upstream TDMA channel, decreasing the gain of a monitoring photodiode and transmitting optical signals, adjusting a modulation current applied to the burst mode laser diode to maintain a desired average transmit power,
wherein a power level of signals transmitted from the laser diode is measurable during an appropriate time slot identified from the time division multiplexing scheme stored in the memory, and the output power level is adjustable based on the measurement.

10. The optical network terminal of claim 9 wherein the dual closed loop feedback control circuit is further configured to measure and adjust an average transmit power level of a burst from the burst mode laser diode during TDMA (time division, multiple access) timeslot in which the burst mode laser diode is generating upstream optical signals.

11. The optical network terminal of claim 9 wherein the dual closed loop feedback control circuit is further configured to adjust the logic zero output power level by adjusting the bias signal.

12. The optical network terminal of claim 9 wherein the closed loop feedback control circuit further includes:
a photodiode for measuring a first optical output power level from a back facet of the laser diode that is proportional to a second optical output power level coupled into a fiber from a front facet of the laser diode; and
a second memory configured to store laser characterization data that expresses the proportionality between the first optical output power level from the back facet of the laser diode and the second optical output power level coupled into the fiber from the front facet of the laser diode.

13. A method of calibrating at least one optical power level generated by a burst mode laser, comprising:
measuring a power level of signals transmitted from a burst mode laser employed in a network node for each of the following:
at initialization of the burst mode laser, following both an increase in a gain of a monitoring photodiode that measures an average transmit power from the burst mode laser, and transmission from the burst mode laser of successive logic zero bits,
during at least one idle time slot on an upstream time division multiple access (TDMA) channel when each of the plurality of network nodes in the PON including said optical network terminal are not transmitting upstream optical signals, following both (i) an increase in the gain of a monitoring photodiode that measures an average transmit power from the burst mode laser, and (ii) a transmission from the burst mode laser of successive logic zero bits,
during operation of the burst mode laser over an assigned time slot on the upstream TDMA channel, following both a decrease in the gain of a monitoring photodiode and the transmission of optical signals, said burst mode laser being biased to transmit logic zero and logic one optical signals only when an incoming data signal is received;
comparing each of the measured output power levels from the burst mode laser to a respective target power level; and
adjusting a bias current applied to the burst mode laser to achieve the respective target power level.

14. The method of claim 13 further comprising:
measuring an average transmit power level of a burst from the burst mode laser during normal in-service operation of the passive optical network;
comparing the measured average transmit power level from the burst mode laser to a second target power level; and
adjusting a modulation current applied to the burst mode laser to achieve the second target power level.

15. The method of claim 14 wherein each of the network nodes is configured to transmit the upstream optical signals during a different TDMA (time division, multiple access) timeslot and a power level of signal transmitted at a logic zero output power level is measured during a remaining available TDMA time slot.

16. The method of claim 15 wherein the average transmit power level is measured during the TDMA timeslot in which the network node including the burst mode laser is configured to transmit the upstream optical signals.

17. The method of claim 13 wherein measuring the power level of signals transmitted from the burst mode laser includes receiving an electric signal from the monitoring photodiode which is generated in response to optical power received from a back facet of the burst mode laser and further comprising increasing a gain response of the photodiode while receiving a measured power level from the back facet of the burst mode laser.

* * * * *

UNITED STATES PATENT AND TRADEMARK OFFICE
CERTIFICATE OF CORRECTION

PATENT NO. : 9,479,255 B2
APPLICATION NO. : 12/112569
DATED : October 25, 2016
INVENTOR(S) : David B. Bowler et al.

It is certified that error appears in the above-identified patent and that said Letters Patent is hereby corrected as shown below:

In the Claims

Column 8, Line 47 (Claim 7): Change "response of the photodiode" to read --response of the monitoring photodiode--

Column 8, Line 50 (Claim 8): Change "includes examining the monitoring" to read --includes examining a monitoring--

Column 8, Line 54 (Claim 8): Change "received from the photodiode" to read --received from the monitoring photodiode--

Column 10, Line 15 (Claim 13): Change "each of the plurality of network nodes in the PON" to read --each of a plurality of network nodes in the passive optical network (PON)--

Column 10, Line 16 (Claim 13): Change "including said optical network terminal" to read --including an optical network terminal--

Column 10, Line 29 (Claim 13): Change "comparing each of the measured output power levels" to read --comparing each of the measured power levels--

Column 10, Line 37 (Claim 14): Change "of the passive optical network;" to read --of the passive optical network (PON);--

Signed and Sealed this
Eighth Day of November, 2022

Katherine Kelly Vidal
*Director of the United States Patent and Trademark Office*